United States Patent [19]
Romney

[11] 3,735,046
[45] May 22, 1973

[54] APPARATUS FOR SIMULATING, PRODUCING AND TRANSMITTING CODE SIGNALS

[76] Inventor: Russell H. Romney, 3259 Bon View Drive, Salt Lake City, Utah 84109

[22] Filed: Aug. 27, 1971

[21] Appl. No.: 175,460

Related U.S. Application Data

[63] Continuation-in-part of Ser. No. 38,382, May 18, 1970, Pat. No. 3,656,157.

[52] U.S. Cl. ....................................178/115, 340/345
[51] Int. Cl. ...............................................H04l 15/02
[58] Field of Search .......................178/115; 340/380, 340/345; 179/90 CS; 35/14

[56] References Cited

UNITED STATES PATENTS

| | | | |
|---|---|---|---|
| 3,228,120 | 1/1966 | Farrell | 178/115 |
| 3,233,344 | 2/1966 | Hartley | 178/115 |
| 2,747,797 | 5/1956 | Beaumont | 340/345 |
| 3,274,588 | 9/1966 | Brown | 178/115 |
| 3,196,279 | 7/1965 | Papelian | 340/345 |

FOREIGN PATENTS OR APPLICATIONS

| | | | |
|---|---|---|---|
| 804,218 | 11/1958 | Great Britain | 178/115 |

*Primary Examiner*—Ralph D. Blakeslee
*Attorney*—Edwin M. Thomas

[57] ABSTRACT

Code signals, such as alpha-numeric elements of the Morse International Code, are produced by rotating a disc member selected from a set bearing character elements represented by perforations in or printed circuit components on the disc. These signal components are sensed by detector means, electronic or mechanical, which are connected to an oscillator or equivalent tone generator and to a suitable amplifier or transmitter. Each separate disc bears a group of annularly spaced characters encoded for detection; a small group of discs thus contains the full code alphabet, including numerical and punctuation characters.

5 Claims, 11 Drawing Figures

INVENTOR.
RUSSELL H. ROMNEY
BY Edwin M. Thomas
ATTORNEY

INVENTOR.
RUSSELL H. ROMNEY
BY
Edwin M. Thomas
ATTORNEY

APPARATUS FOR SIMULATING, PRODUCING AND TRANSMITTING CODE SIGNALS

The present application is a continuation-in-part of my pending application, Ser. No. 38,382, filed May 18, 1970, entitled, "Apparatus and Method for Producing and Transmitting Signals," now U.S. Pat. No. 3,656,157, issued Apr. 11, 1972.

BACKGROUND AND PRIOR ART

A number of devices have been proposed in the past for teaching code signals, such as the Morse Code, to Boy Scouts, amatuer radio operators, military personnel, and others. Some of these devices have been quite complex and expensive, and there has been a demand for a relatively simple and inexpensive device which can simulate the tone signals and serve as a practice tool for those who desire to become expert in code transmission and reception. Former methods of teaching the Morse Code by visual dot-and-dash images have been found to be much less effective than those which are based on communication by sound. An operator gains skill as he learns to recognize the "dit," "dah" signals by sound. Various recording devices employing tapes and other records have been used to simulate messages, being played at various speeds, depending on the ability of a listener to comprehend.

A particular present object of the present invention is to make available a simple and relatively inexpensive apparatus for generating Morse Code sound characters which are precisely accurate in tone and relative time lengths of the various code components, such as dots, dashes and the silent spaces between. It is desirable to be able to accomplish this at various speeds without substantially changing the pitch or tone of the signal characters generated.

It has also been learned from experience that a very effective way of teaching and learning the code is to take a small group of signals and practice them until they are readily and accurately understood at fairly high rates of transmission. The present invention is designed to facilitate such study of code elements by providing record devices bearing symbols in groups of five, six, or seven, for example, such a group of characters being represented on a single record disc member. Thus, the whole alphabet, plus Arabic numerals and the usual necessary punctuation elements can be represented on a small group of record members. Each disc record bears a small group of characters selected preferably for convenient study together.

In the U.S. Pat. No. 3,656,157, mentioned above, there is disclosed an apparatus for using perforated record discs of the type just referred to. In one particular embodiment therein disclosed, simple means are shown and described for producing an audible signal tone by blowing orally, i.e., by means of a simple whistle which can be sounded by the operator while he rotates the disc manually or mechanically. Other modifications produce sound by electronic means, such as an oscillator, connected to detector means in the form of light sensing elements which are activated by local elements on the disc record. The latter may be used to sense perforations in an opaque disc which rotates past the detection means. The various characters on a single disc are arranged in annularly spaced bands or groups, the detecting means being movable radially of the disc to align with one annular group or another.

The present invention represents certain improvement over those described in the parent patent, but it also includes some of the features therein described.

DESCRIPTION OF PREFERRED EMBODIMENT

Figures 1, 1A, 2, 2A, 3:
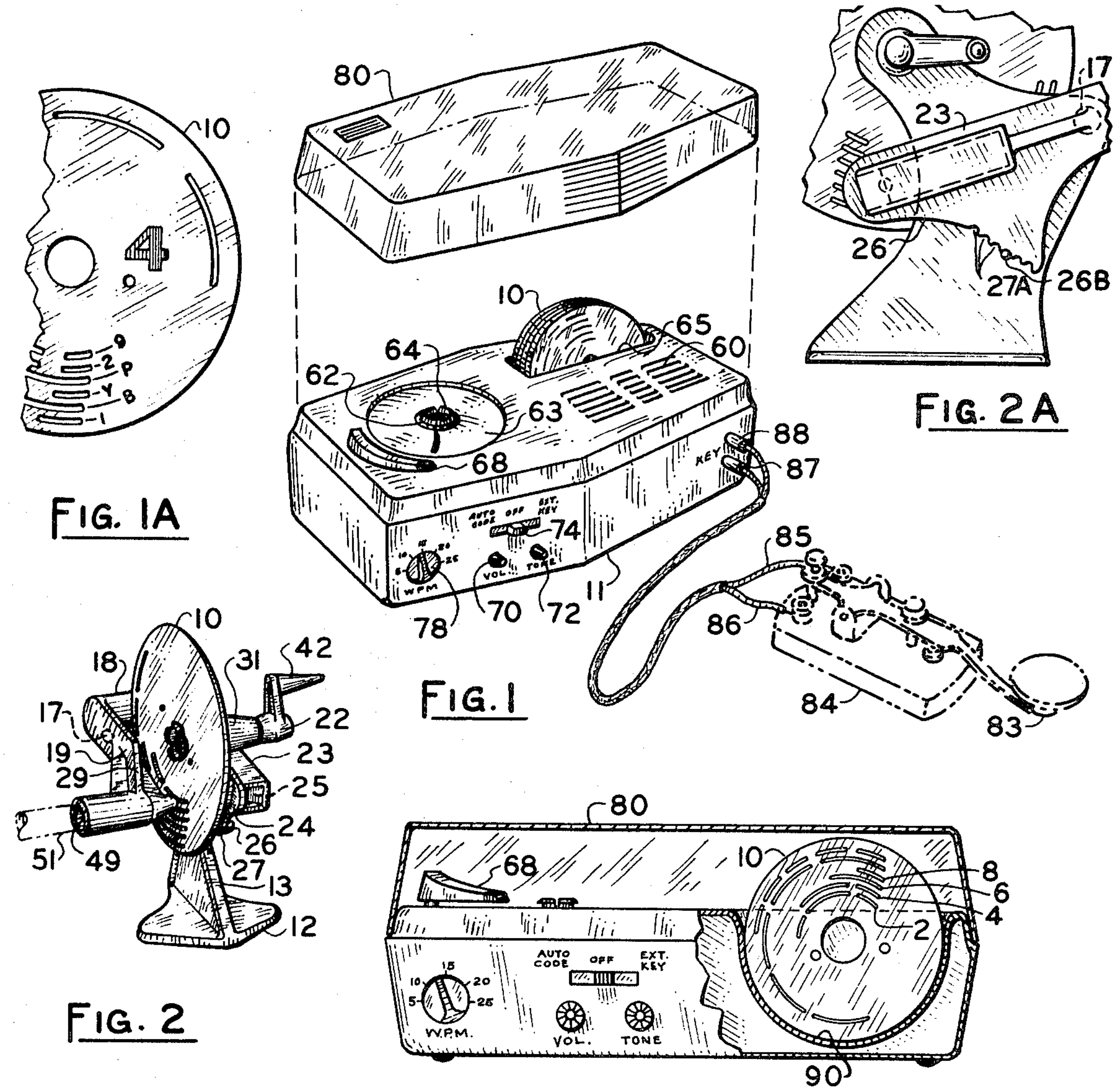
FIG. 1 is a perspective view of an electronic sound generating means for producing alpha-numeric Morse Code signals, according to a preferred embodiment.
FIG. 1A shows fragmentarily a perforated record disc.
FIG. 2 shows a simple sonic or whistle operated type apparatus as disclosed in the parent application for the same purpose.
FIG. 2A shows a variation of the device of FIG. 2.
FIG. 3 shows a side view of the apparatus of FIG. 1, certain parts being broken away and certain other parts being shown in section.

FIG. 1 shows a perspective view of an electronic device for producing audible signals. This device is designed for using a set of discs which collectively carry all the characters of the alphabet and the conventional Arabic numerical system as commonly used in International Morse Code. The device consists of a frame or box 11 made of suitable material and having a suitable speaker, not shown in detail. The speaker is located inside the box below the sound releasing perforations 60 shown on top of the box, in a conventional manner. The device includes a motor driven disc support spindle 62 projecting through a secondary cover plate 63, and having a lug means 64 adapted to engage and hold for driving engagement one of the discs 10. The discs 10 are shown deposited in a pocket 65 in the upper right corner of the case. A recording or detecting stylus 68 in the form of a pivoted arm is arranged to be swung over the disc on hub 62 to sense the data carried by a disc 10. That is, it perceives the coded signals on the disc 10 which are picked up as signals and transmitted to an oscillator or tone producing device, and an amplifier of conventional type, not shown in detail, but located inside the box 11. These oscillator or sound-producing parts, which are of conventional construction, will not be described in detail, but will be referred to further hereafter. The device of FIG. 1 may be battery operated, or, if desired, it may be provided with a power connection for conventional house current, now shown. The oscillator-speaker assembly includes a volume control 70, a tone control 72, and an on and off switch lever 74. The latter lever also can be moved to any of three positions, namely, to the right for operation by a conventional telegraph key, to the middle position, which is off, to an automatic code generating position at the left. A speed control for the motor inside is provided at 78. This motor drives disc support spindle 62.This speed control is graduated for different code transmission rates indicated in FIGS. 1 and 3 and "wpm" (words per minute). As indicated, the device may be set to sense and generate signals at various speeds, such as five words per minute for the beginner, or 10, 15 or 20 or 25 or more words per minute for those who are more expert.

A removable cover 80 is provided for box 11 which normally sits on the base and covers the discs copenings 60, hub 62, etc. A conventional Morse telegraph key is indicated at 83, FIG. 1. It is shown mounted on a base 84 having appropriate contact posts connected by wires 85 and 86 to plugs 87 and 88 adapted for connection to the sound-producing instrument in case 11. Some of the other parts described above are shown in greater detail in FIG. 3 where a full disc 10 is shown mounted in a semi-circular pocket 90, the cover 80 being in place, with the pick-up arm 68 being shown in elevation at the left.

FIG. 2 shows a simple air operated code-producing device which also is designed to use the same perforate code record discs 10 as the device of FIG. 1. This code-producing device is of simple air operated type, disclosed and described in greater detail in the parent application, Ser. No. 38,382, referred to above. The apparatus comprises a base 12 adapted to be fastened to a table or analogous support and having an upwardly extending standard arm or main frame element 13. A bifurcate bracket is pivotally mounted on arm 13 at 17 and comprises a transverse hollow shaft or bridging pivot element 18 at one end of which is attached a forwardly extending arm 19. The latter is arranged more or less parallel to the face of the upright arm member 13. A rear arm 23 integral with shaft or bridge element 18 is provided also and includes a mounting opening at its forward or right end 24, as shown, adapted to receive a sound-producing member 25 such as a whistle. Arm 23 also comprises a downwardly directed extension 26 which carried a spring pressed detent ball 27. The latter is adapted to snap into any one of a plurality of detent holes or position-retaining holes or depression formed in the rear face of upright standard 13. This serves as a retainer or holding means to keep the bifurcate member in a particular angular position aligned about its pivot point 17 with a particular selected annular group of code or signal elements on the disc 10.

The front arm member 19 of the bifurcate member is laterally offset, as shown at 29, and is bored at its forward end 49 to receive and hold snugly a hollow cylindrical member or tubular part 51. The latter may be merely a simple tube through which air is blown orally, by the operator. It directs said air towards the whistle 25 on the opposite arm, but only when there is no obstruction or solid part of the disc 10 between parts 49 and 24. Ordinarily, the disc 10 is interposed between the members 51 and 25, but when there is a slot or opening in the disc 10, in alignment with the axis of these members, the air flows straight through and activates the whistle 25. If desired, some other medium, such as light or an electric current, can be passed through the disc perforations similarly. In the latter case, a conduit for light or an electric conductor will be used as a sensing means instead of the orally blown air stream, as more fully described below.

The disc 10 of FIGS. 1A and 2 is identical with one of the discs 10 in FIGS. 1,2,3 and 4. All of them are provided with series or groups of arcuate perforations, each group being arranged in one of several spaced concentric rings as indicated at 2, 4, 6 and 8, FIG. 3. The disc shown in FIG. 3 has six sets of code elements. The set or annular group 2 nearest the center represents the signal bits "dit, dah, dit." The next group towards the outer edge represents "dit, dah," etc. Each group is arranged to reproduce one and only one of the characters of the alphabet, or an Arabic numeral or a punctuation mark, etc., i.e., single alpha-numeric characters as will be readily understood. By shifting the device 51 from one annular group to another, i.e., about pivot 17, it can be aligned with any desired one of these alpha-numeric characters, sets or groups of signal elements, being retained in such alignment by the ball detent 27 previously mentioned.

Referring further to FIG. 2, the disc 10 is adapted to be positioned on the left end of a hub member 22 journaled in a bearing member 31 attached to or integral with the upwright frame member 13. A crank handle 42 is attached to the hub 22 for rotating it and the disc is adapted to be secured to the front or left end of the hub member for rotation in a plane between the blower device 51 and the whistle 25. Obviously, through the tube 51 aligned with one annular group of signal bits, while rotating the crank 42 and hence turning the disc 10, between the tube 51 and whistle 25, a series of code elements, such as those in annular group 6, FIG. 3, on the disc, will pass between the blow tube and the whistle and the whistle will reproduce in sound the characters represented on the disc.

In FIG. 2A there is shown a device of the same general type as in FIG. 2, except that the detent means for holding the bifurcate lever in the selected annular path with respect to the disc 10 is modified. In this case, the arm 23, 26 is made of a somewhat flexible and resilient material, such as a tough plastic, e.g., nylon or Delrin. It is provided with a series of notches 27A arranged arcuately with respect to pivot point 17 along the edge of member 26, and adapted to cooperate with a projecting pin 26B. The posts yield enough that the arm can be moved from one radial position (arcuate path) on the disc 10 to another, but the pin engaging notches 26B with sufficient force to retain this selected position.

Figure 2B:
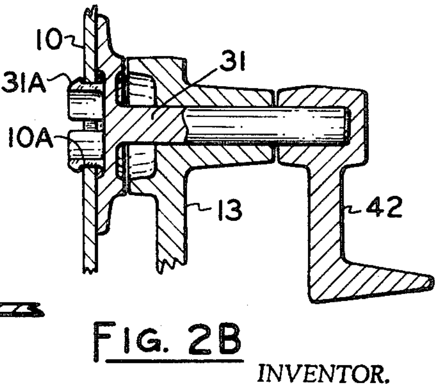
FIG. 2B shows a sectional detail of a disc rotating and holding means generally similar to but in some respects a variant of FIG. 2.

FIG. 2B shows a modification of the hub structure and illustrates how the disc 10 is retained on axle or hub 31, FIG. 2, by resilient locking lips or legs 31A which grip the control opening 10A in disc 10. This insures that disc 10 will be driven in positive rotation when crank 42, which is fixed to hub or axle 31, is turned.

Figure 4:
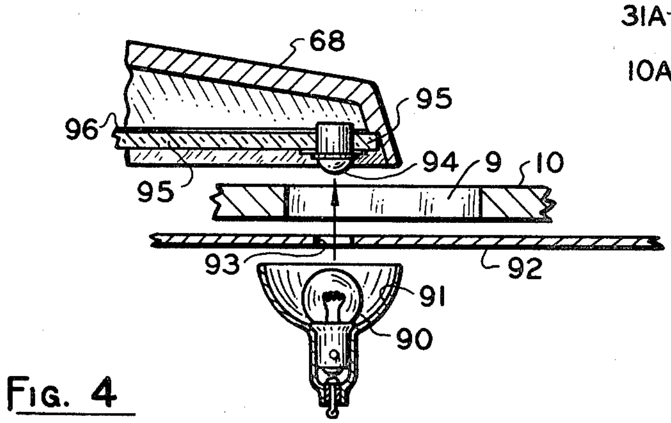
FIG. 4 is a sectional detail on a larger scale of a photosensitive detector means suitable for use in the embodiments of FIGS. 1, 2 and 3.

Instead of using the whistle and blow tube as in FIG. 2, other detector means, such as beam of light controlled by the disc 10, may be used. FIG. 4 shows a light source such as an incandescent lamp 90 mounted in a reflector 91 and below a plate 92 which may correspond to the cover, shown as element 63, FIG. 1. It has a perforation 93, through which light may pass. Part 92 underlies the disc 10. It may serve also as a cover for certain electronic parts. The disc 10, shown fragmentarily in FIG. 4, is rotated so that a slot 9, part of an annular group of signal bits, is passing between light 90 and a photocell 94 mounted in an insulator member 95 in the detector arm 68. Obviously, this detector arm 68 fulfils the same general function as the arm 19 of FIG.

2. The photocell in turn is connected to a conductor 96 which leads to an appropriate but conventional amplifier and oscillator mechanism not shown for producing tones under control of the light flowing from lamp 90 to the light sensor 94.

The arm 68, FIGS. 1, 3 and 4, is arranged to be positioned and held selectively in an aligned position over any one of the alphabetic or numerical characters, each of which is represented by an annular group of code elements on the disc 10. This is held in place by means such as a ball detent or equivalent 27 in FIG. 2 or by notches 27A, FIG. 2A, engaging spring pin 26A. Holding means are not shown in FIGS 1 or 3. By selecting a particular ring or annulus of code elements and rotating the disc, either by means of a motor as in FIG. 1, 2 or 4, or by hand as in FIG. 2, the code for a given letter of the alphabet or other character can be repeated in sound once in each disc revolution and as many times as desired and at any desired speed. The speed is controlled manually in FIG. 2; in the other figures it can be controlled as desired by setting the "wmp" switch which controls the speed of the drive motor for the turntable or spindle 64 on which the disc 10 is secured.

A conventional oscillator is provided to set up a tone of the desired pitch, being turned on and off under control of the detector 94 or 68, as the rotating disc exposes openings to the light. As suggested above, the detector may be a beam of light in FIG. 4, or it may be an electric conductor type detector, as will be explained next.

Figure 5:
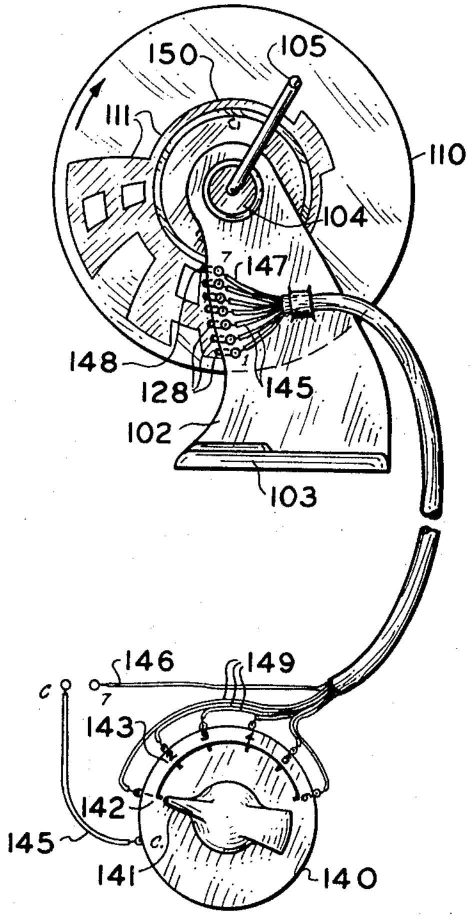
FIG. 5 is a side view of another modification.

Referring now to FIG. 5, a simple manually operable device is shown, which is, in general, quite similar to that of FIG. 2. It comprises a stand 102 which is supported on a base 103 and which mounts for rotation a hub or shaft 104 that can be turned manually by means of a crank 105. The disc 110 is formed in this case, on its front face as in FIG. 5 with a printed circuit 111 so arranged that a group of brushes or detectors 128 are positioned at each of the annular paths or stations. All these brushes make and break contact to detect a code in dots and dashes, but only one of them is live because they are connected individually by conductors 145 to a selector switch 140.

Manually operable switch 140 is shown with a movable pointer or contact 141 pivoted thereon. The latter can be set to connect with any one of six different contact positions, 142, 143, etc. The switch 141 is connected to one lead 144 of a signal output pair 145, 146, whereas the points 1 to 6 indicated in FIG. 5 are connected individually to conductors 149 which lead to the set of brushes 128, FIG. 5, each of which is set for contact in one of the annular channels or paths of code elements printed on disc 110, mounted in the upright member 102. These brushes are thus activated selectively by the setting of switch 141. The other output terminal 146 is connected by lead 147 to a brush 148 which makes continuous contact with a continuous annular element 150 of the pattern printed on disc 110. Hence, as the crank 105 is turned in this figure and the disc is rotated, the selected band of signal elements will depend on the particular character encoded on the disc and the setting of the switch or pointer 141. The switch 141 obviously is a variant of the pick-up 126 of FIG. 7. The setting of switch 140, FIG. 5, can be effected, if desired, in the same general manner as the setting of pick-up member 126 of FIG. 7, in which case it would be coordinated with the pointer 113 and the characters shown in FIG. 6.

Figure 6:
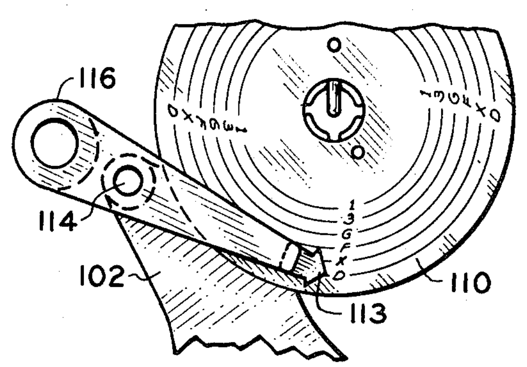
FIG. 6 is a fragmentary view of the device of FIG. 5, showing particularly the opposite side of the record disc and associated parts.
Figure 7:
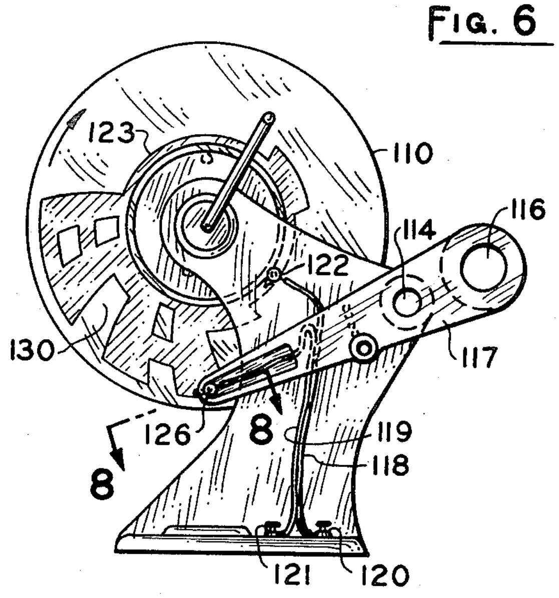
FIG. 7 is a side view of still another modification.
Figure 8:
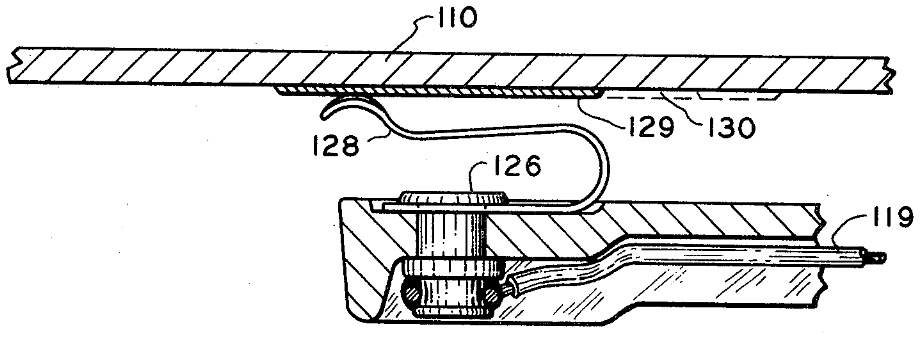
FIG. 8 is an enlarged fragmentary sectional view showing a printed circuit record and a conductive type detector device.

As shown in FIG. 6, in a rather similar arrangement, a pointer arm 113 is pivoted for swinging in a vertical plane on the upright member 102 at 114. It can be positioned and held be a detent at any one of the annular positions where data on the disc are to be detected. In this particular case, the characters are represented beginning at the bottom towards the center of the disc in the order D, X, F, G, 3 and 1. The arm 113 is a bifurcate arm which is quite similar to arm 19, 23 of FIG. 2, the two parallel parts being connected by a transverse tube member 116. When the arm is moved about its pivot 114, FIG. 6, the corresponding arm 117 on the other side of the disc, FIG. 7, moves also about center 114 to position a brush opposite the disc. As shown best in FIG. 7, two electric leads 118, 119, are connected to the base at 120 and 121. These are used to complete the circuit to a tone-producing oscillator and amplifier not shown. One of these leads 118 connects to a terminal 122 which makes contact with a continuous band of conductive material 123 on the disc 10, FIG. 7. Disc 110 in this case is of insulating or nonconductive material. The other lead 119 connects to a pointer 126 on arm 117. This is shown in the form of a rivet, FIG. 8, bearing a contact brush 128 which slides over the face of the disc as the disc is rotated. When a conductor element 129, see FIG. 8, comes along, the brush, of course, makes contact and the oscillating device produces a tone. When it comes to a gap or hole 130 in the coding, see also FIG. 7, contact is broken and the tone ceases. The printed circuit in the form of metal deposited on the disc 110 is a continuous deposit so that a circuit is completed from contact 121 to brush 128 whenever the latter encounters a metal deposit. By a printed pattern shown typically in FIGS. 5 and 7, but obviously varied to suit different code elements, any desired combination of characters can be reproduced from a single disc. As pointed out above, it is preferable to use about five, six or seven characters or so on a given disc. Any one disc can be used for training an operator in the group of characters it bears by repeating them from time to time in any desired sequence.

Instead of using conductive electric circuits as in FIGS. 5 to 8, a photocell may be used to detect either openings in an opaque disc or opaque spots in a transparent disc, in the manner already described in connection with FIG. 4. In this case, the photocell is to be positioned so it can be moved to any one of the stations 1 to 6 or 1 to 7 shown on discs 110, FIGS. 5 and 6. In this case, if a perforated disc is used, signals are given when perforations come along. If desired, the perforated discs 110, FIG. 1 and FIG. 2, see also FIG. 4, may be replaced by a transparent disc on which opaque areas are provided. In this case, using a photocell as detector and a light source opposite the disc, the interruption of the light will be used to energize the oscillator and produce the tone signal. Alternatively, if desired, a suitable coating may be applied to a transparent disc member to leave it transparent only in positions where sound is to be produced. In this case, the conduction of light produces the signal in the same manner as in FIG. 4. These variations are obvious to those skilled in the art.

With any of these arrangements, whether using a current of air and a whistle, using a light beam as detector for opaque or transparent images, or using a printed circuit and a brush system, a small, simple set of disc record members 10 or 110 provides the necessary record members which can be replayed as often as necessary and at various speeds to give practice and training to the operator. As further described and claimed in the parent application, by use of a control record, detector means, commutator means and light conductive elements, such as light fibers, etc., various signals may be produced and various functions may be controlled in analogous manner. The present invention, however, is directed primarily to the production of audible signals, using conventional sound-producing means, especially oscillator means, or equivalent and to the control of such signals by the use of individual record discs, each of which bears a small group of the characters or symbols to be reproduced.

It will be obvious that many variations may be made in the arrangement of the different parts and in the manner in which the symbols or code signals are produced and/or controlled without departing from the spirit of the invention. It is intended by the claims which follow to cover these obvious variations as broadly as the state of the prior art properly permits.

What is claimed is:

1. In a code producing apparatus of the character described, the combination which comprises a frame, a spindle mounted rotatably in said frame and provided with means for detachably retaining a code disc, a group of said code discs individually and releasably mountable on said spindle, each of said discs bearing a plurality of concentric bands of signal bits or elements which make up one and only one alpha-numeric character in each band, the group of discs containing in total a complete set of alpha-numeric characters but each disc bearing only a minor part of said complete set, a single signal bit sensing element mounted in said frame adjacent a disc mounted on the spindle and selectively shiftable radially of said disc to align with any desired band of signal elements on said disc, means for driving said spindle in rotation at various speeds, and transducer means responsive to the sensing of bits on said band to reproduce in sound the single character of the alpha-numeric set one time and only one time for each complete rotation of said spindle.

2. Combination according to claim 1, in which the disc bears printed circuit elements including conductive areas defining signal elements, and having brush means for detecting significant parts of said areas thereby to control audible code signals produced by an electric oscillator.

3. Combination according to claim 1, in which the disc bears a printed circuit and in which one complete annular area of the disc is coated with conductive material to form a continuous contact during continuous rotation of said disc.

4. Combination according to claim 3, in which the signal is produced by electrical oscillator means.

5. Combination according to claim 1, in which the record member is a disc bearing a printed circuit to represent said plurality of concentric paths.

* * * * *